Figure 1:
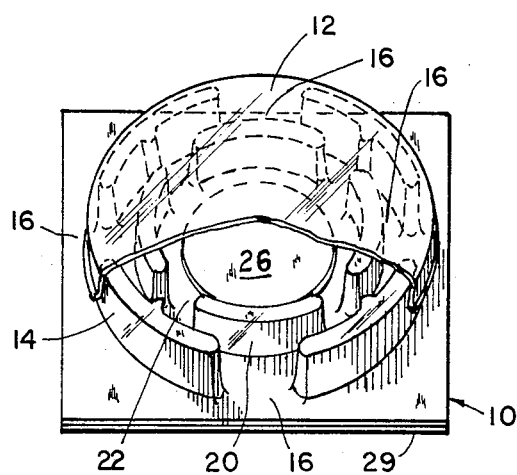

United States Patent [19]
Woodruff et al.

[11] Patent Number: 4,563,836
[45] Date of Patent: Jan. 14, 1986

[54] INSECT FEEDING STATION

[75] Inventors: Keith Woodruff, Mountainside; Eugene Brandli, Towaco, both of N.J.

[73] Assignee: American Cyanamid Co., Stamford, Conn.

[21] Appl. No.: 548,027

[22] Filed: Nov. 2, 1983

Related U.S. Application Data

[63] Continuation of Ser. No. 476,976, Mar. 25, 1983, abandoned, which is a continuation-in-part of Ser. No. 251,672, Apr. 6, 1981, abandoned.

[51] Int. Cl.$^4$ .............................................. A01M 1/20
[52] U.S. Cl. ..................................................... 43/131
[58] Field of Search ................. 43/131, 114, 132, 107, 43/121

[56] References Cited

U.S. PATENT DOCUMENTS

| | | | |
|---|---|---|---|
| 547,220 | 10/1895 | Madden | 43/121 |
| 1,922,702 | 8/1933 | Kristman | 43/131 |
| 3,040,470 | 6/1962 | Kanin | 43/131 |
| 3,341,967 | 9/1967 | Kelley | 43/121 X |
| 3,704,539 | 12/1972 | Alvarez | 43/131 |
| 3,899,080 | 8/1975 | Brunda | 206/820 X |
| 4,228,613 | 10/1980 | Kalnasy et al. | 43/131 |

Primary Examiner—Nicholas P. Godici
Assistant Examiner—Carmine Cuda
Attorney, Agent, or Firm—Charles J. Fickey

[57] ABSTRACT

An insect feeding station having a unitary base portion formed from a deformable material such as a plastic material, the base portion having a poison at the central area and ridges forming guide and baffle means to guide insects from the periphery of the station to the central poison area and to prevent probing of the poison from outside the station, and optionally, a partially or totally transparent cover. The station may have also a contrasting color under the poison to make removal of the poison easily detectable when at least a part of the cover is transparent.

13 Claims, 8 Drawing Figures

INSECT FEEDING STATION

This application is a continuation, of application Ser. No. 476,976, filed Mar. 25, 1983, now abandoned, which is a continuation-in-part, of application Ser. No. 251,672, filed Apr. 6, 1981, now abandoned.

This invention relates to a device for destroying insects. It more particularly relates to an insect feeding station whereby poison may be administered to insects without endangering children or domestic animals, and having means to guide insects to the poison, which may be readily and inexpensively formed from deformable materials such as plastic, by well known thermoforming, vacuum forming or injection molding methods.

Various types of devices have been known in the prior art for destroying insects. In some devices, the insects are trapped in the device after entering, either by mechanical construction, or by sticking to a gummy substance. In either instance, the device is soon full and useless. In devices which contained a poison, it was easy to shake out loose poison, or probe through openings to reach the poison, thus making them a danger to children or small domestic animals. In addition, prior devices are generally of a construction that the interior of the device is difficult to view so that it is not readily ascertainable whether insects are using the device or how much poison has been used.

It is, therefore, an object of this invention to provide an insect feeding station which is not dangerous to children.

A further object is to provide an insect feeding station in which it is readily possible to detect the use of the poison.

Another object is to provide an insect feeding station which is easily and inexpensively formed from deformable materials by known methods.

Another object is to provide means to guide insects toward the poison in an insect feeding station.

These and other objects of the invention will become apparent as the description thereof proceeds.

The objects of this invention may be attained and the disadvantages of the prior art devices overcome by the use of the present invention. The invention has a base portion for carrying the poison and a cover. The base portion has outer case walls having a plurality of openings and has a poison located at the center of the case. The outer case may be of any configuration, e.g., round, square, or rectangular.

The base has inner guide and baffle walls leading from the openings up to the poison and the walls are so positioned that a probe cannot contact the poison if thrust into any of the outer wall openings.

The base is formed as a unitary piece from a deformable material such as a plastic by known methods. One method for forming the base is from a flat sheet of plastic which is either thermoformed or vacuum formed over a suitably designed mold to form the ridges which act as guide and baffle walls, and the central poison area. It is also possible to form the base by injection molding of a molten plastic into a suitably designed mold. The cover of the device is also formed in like manner as a unitary piece which is attached to the top of the device. The cover is permanently affixed to the base and, optionally has at least a part which is transparent so that the poison is visible through the cover.

The poison is preferably of the type known as bait, i.e., it is a mixture of slow acting poison and some food material attractive to insects, such as flour, molasses, peanut butter or the like. The bait is preferably of a paste like or solid consistancy. Thus, insects are attracted to the device, eat the bait and leave the device to die elsewhere. The bait may be a molded shape, e.g., a flat wafer affixed to the floor of the inner compartment.

It is also a part of this invention, when at least a part of the cover is transparent, to have a contrasting color beneath the bait, so that it is readily visible in darkened areas. As bait, is removed by insects, the contrasting color underneath becomes visible and provides an indication whether insects are using the station and how much bait has been used. The contrast between the bait and the background may be accomplished in a number of ways. A contrasting color may be coated in the inside of the poison area before the bait is placed. The base may be of a transparent material, and a contrasting color backing sheet may be applied to underside of the base. Another method is to form the entire base portion of the station from a plastic which is of a color that contrasts with the bait.

The invention may be better understood by reference to the drawings in which

Figure 8:
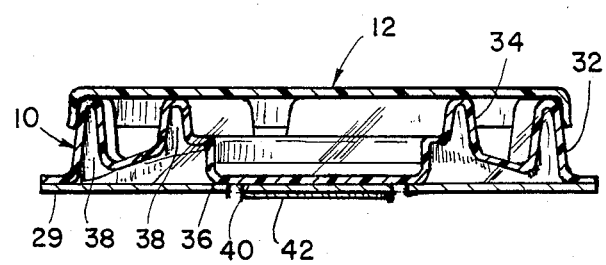
Figure 2:
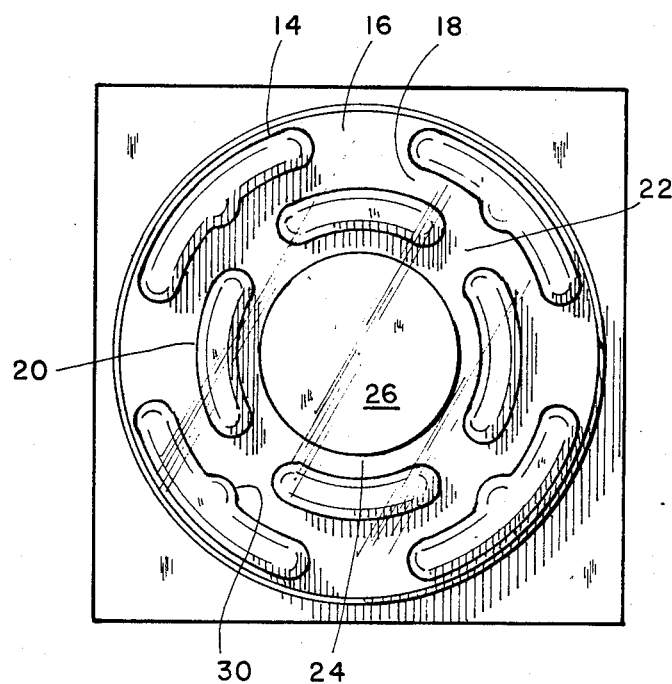
Figure 3:
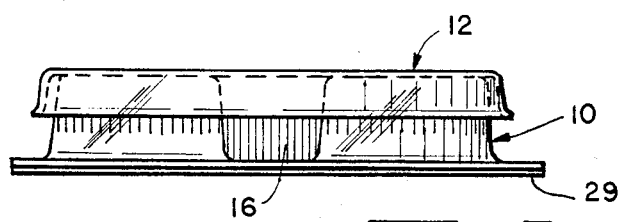
Figure 4:
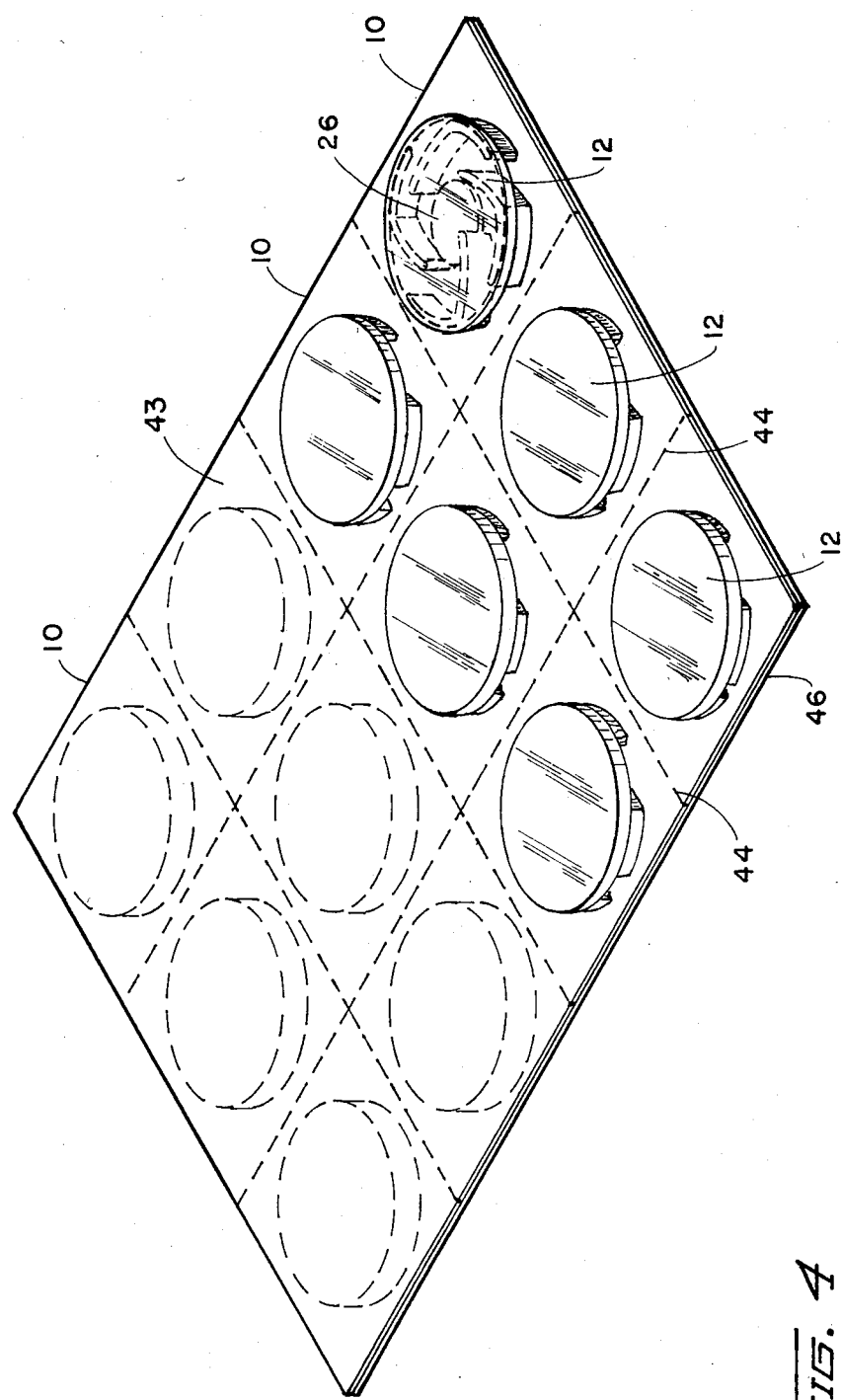
Figure 5:
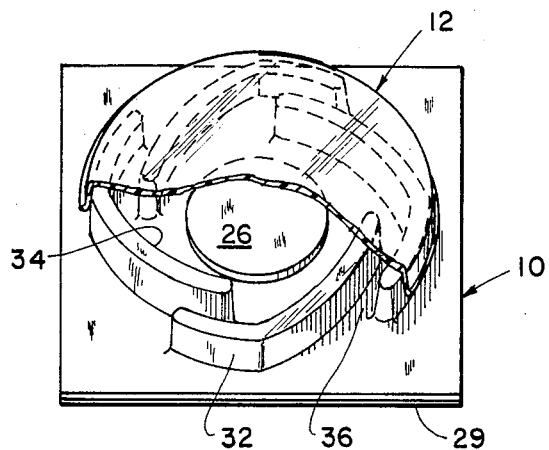
Figure 6:
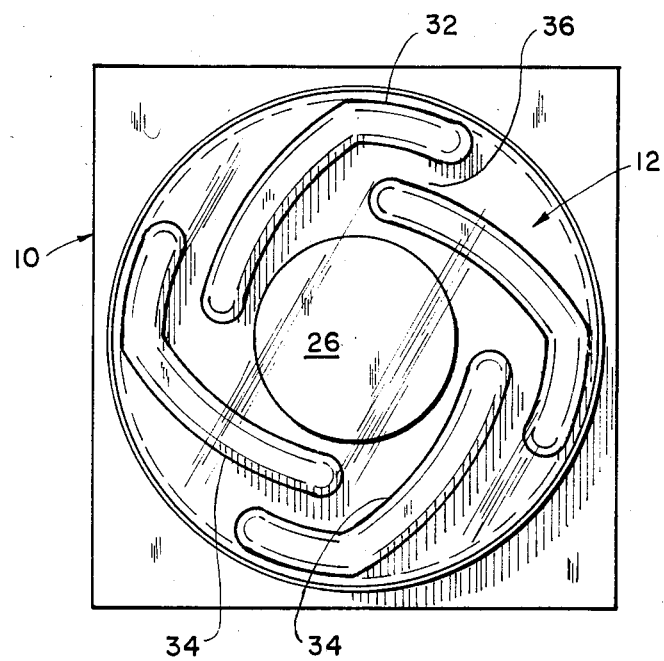
Figure 7:
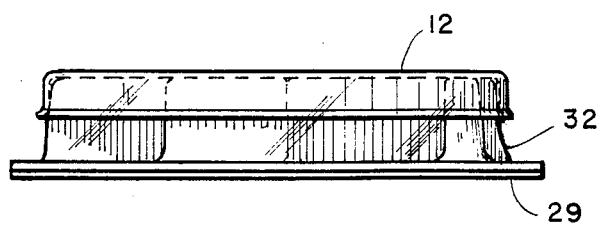

FIG. 1 is a top perspective view of the insect feeding station of the invention with parts of a transparent cover broken away, showing an embodiment of the invention having guide and baffle walls, FIG. 2 is a top plan view of an embodiment of FIG. 1, FIG. 3 is a view in elevation of the embodiment in FIG. 1, FIG. 4 is a perspective view of a plurality of insect feeding stations made from a single sheet of plastic material, FIGS. 5, 6, and 7 represent embodiments of the insect feeding station similar to FIGS. 1, 2 and 3 respectively, with alternative guide and baffle means, and FIG. 8 shows a cross-section taken along the lines 8—8 of FIG. 6, with an alternative floor construction of the base.

Referring to FIGS. 1, 2 and 3 the insect feeding station of the present invention comprises a base portion 10 and cover 12. The base portion is formed from a suitable plastic, and may be transparent plastic but need not be transparent. Base portion 10 has outer casing wall 14 with openings 16, a floor 18, inner compartment walls 20 with openings 22. Inner compartment wall 20 forms an inner compartment 24. Bait 26 is affixed to floor 18 in inner compartment 24. When at least a part of cover 12 is transparent, as shown, the floor of inner compartment 24 may be coated with a contrasting color layer before affixing the bait. Alternatively, a contrasting color may be provided by having base 10 formed of a transparent plastic and affixing a backing sheet 29 of a contrasting color. Another method for providing a contrasting background beneath the bait is to mold the entire base 10 from a plastic material of a contrasting color.

In the embodiment of FIGS. 1 to 3, the inner surface of the outer casing wall 14 is curved inwardly at 30 to guide insects entering openings 16 towards openings 22 into the inner poison compartment 24. This is done to prevent an insect from entering at one outer opening 16, and wandering randomly along the inner wall and out the next opening 16.

Cover 12 extends to the periphery of outer casing walls 14 to close the base portion 10 and may also be formed from a sheet of plastic. Cover 12 may have at least a portion which is transparent (or the entire cover may be transparent, as shown) so that bait 24 may be readily seen and is permanently affixed to base 10 as by adhesive or any suitable means.

As illustrated, the insect feeding station may be flat on a floor or other desired area. Insects may enter the device through openings 16 and are guided by curved walls 30 to offset openings 22 to reach bait 24 in the inner compartment, and may leave through the same openings. The consumption of bait 24 may be viewed through transparent cover 12, and be readily visible due to contrasting background 29 under the bait.

Although insects may easily reach the bait, it will be readily apparent in FIG. 1 that a probe placed in any opening 16 in the outer casing wall 14 will not enter the inner compartment wall 20 due to offset openings 22 in wall 20. Thus, the bait is safe from inquisitive children.

The device could also be mounted on vertical surfaces by means of double sided adhesive tape (see FIG. 8) on the lower surface 29 of base portion 10. Since bait 24 is affixed to the floor of the inner compartment, it will not be disturbed and will remain in the same position within the device.

FIGS. 5, 6 and 7 illustrate an embodiment of the invention which is essentially similar to the embodiment of FIGS. 1, 2 and 3 in base structure of the device. The outer case walls 32 are elongated and curved inwardly towards the center poison area 26 to provide guide walls 34. The extended walls 32 form a plurality of openings 36. A cover 12 extends to the outer ends of walls 32. Insects entering openings 36 will be guided along walls 34 to poison 26. The walls 34 have a curvature such that a probe thrust into any opening 36 cannot contact poison 26. When a part, or all, of cover 12 is transparent, poison 26 is placed over a contrasting color material, as in the embodiment of FIGS. 1, 2 and 3, so that poison 26 is visible through the cover.

FIG. 8 illustrates an alternative embodiment of the device of FIGS. 5, 6 and 7 wherein the base 10 is vacuum formed from a flat sheet of plastic, to form walls 32 and 34. As shown, the floor 18 rises from the periphery of the device so that the central area forms a depression 36. This is advantageous when the poison or bait 26 is in the form of a melt, since it can be poured into the depression and allowed to solidify. As shown, vacuum forming leaves hollow areas 38 beneath the base and the backing layer 29 serves to close the lower base area and also to stiffen the device. Backing 29 may have a cut out in the center for attaching a two sided adhesive tape 40 with a peel off layer 42 to the lower surface of base 10. Thus, by removing layer 42, the device may be affixed to a vertical surface by adhesive tape 40. This is a preferred arrangement of the adhesive mounting, since the device will be completely flush with the surface, and insects will not have a tendency to crawl under the device instead of into it, as might occur when the adhesive is mounted on the bottom of backing 29.

FIG. 4 illustrates the formation of a plurality of insect feeding stations from a single sheet of plastic 43. Sheet 43 is vacuum formed over a suitable mold to form a plurality of base units 10, each of which then is filled with poison 26, and provided with a cover 12. Score lines 44 are provided to make separation of the individual feeding stations easy. A single backing sheet may be attached to the sheet 43 after vacuum forming. This method of forming the insect feeding stations is particularly useful when it is desired to market a number of devices as a unit, so that the customer may separate them and use as required.

It will be seen that the present invention provides an insect feeding station for administering poison to insects, particularly crawling insects which has means to guide insects to the poison and entry baffle system so that children cannot probe the bait containing compartment, and whereby, optionally, signal is provided allowing the ready detection of the removal of poisonous bait, even in dimly lit areas and without removing the device. The device is also simple and inexpensive to manufacture.

We claim:

1. An insect feeding station for administering poison to insects comprising a base portion and a cover, said base portion comprising a floor, an outer wall having a plurality of openings, an inner wall spaced apart from said outer wall and having a plurality of openings, said inner wall openings being offset in a horizontal plane from said outer wall openings, said inner wall forming an inner compartment for said poison, and means on the interior of said outer walls for guiding insects toward said openings in said inner walls, said base portion being formed as a unitary piece from a flat deformable sheet of material.

2. The insect feeding station of claim 1 wherein at least a part of said cover is transparent for viewing said poison.

3. The insect feeding station of claim 1 comprising means to affix said station to a vertical surface.

4. An insect feeding station for administering poison to insects comprising a base portion and a cover, said base portion being formed as a unitary piece, said base portion having a center area containing a poison, and a plurality of walls leading from the periphery of said base portion to said center area, said walls being spaced apart to define passageways from said periphery to said center area, each of said walls comprising an outer circumferential portion and an inwardly curved portion defining said passageways such that a direct line into said passageway from the periphery will abut said inner wall portion preventing direct line passage to said center area, said base portion being formed from a flat deformable sheet of material.

5. The insect feeding station of claim 4 comprising means to affix said station to a vertical surface.

6. The insect feeding station of claim 4 wherein said sheet of material is a plastic material.

7. The insect feeding station of claim 4 wherein said poison is a bait mixture of food and poison.

8. The insect feeding station of claim 7 wherein said bait mixture is a solid mixture affixed to the floor of said inner compartment.

9. The insect feeding station of claim 8 comprising a contrasting color beneath said bait.

10. The insect feeding station of claim 4 wherein at least a portion of said cover is transparent for viewing said poison.

11. The insect feeding station of claim 10 comprising a contrasting color beneath said poison.

12. The insect feeding station of claim 11 wherein said base portion and cover are transparent plastic and said contrasting color is provided by a backing sheet affixed to the lower side of said base portion.

13. The insect feeding station of claim 8 wherein said base is formed from a plastic having a color which contrasts with the color of the poison.

* * * * *